Nov. 22, 1960   E. A. SCHUCHARD   2,961,604
APPARATUS AND METHOD FOR DETECTING AND RECORDING
TOTAL MAGNETIC FIELD GRADIENTS
Filed Oct. 11, 1950   5 Sheets-Sheet 1

INVENTOR.
E. A. SCHUCHARD
ATTYS

Nov. 22, 1960 E. A. SCHUCHARD 2,961,604
APPARATUS AND METHOD FOR DETECTING AND RECORDING
TOTAL MAGNETIC FIELD GRADIENTS
Filed Oct. 11, 1950 5 Sheets-Sheet 2

INVENTOR.
E. A. SCHUCHARD
BY
ATTYS

INVENTOR.
E. A. SCHUCHARD

United States Patent Office 2,961,604
Patented Nov. 22, 1960

2,961,604

APPARATUS AND METHOD FOR DETECTING AND RECORDING TOTAL MAGNETIC FIELD GRADIENTS

Earl A. Schuchard, 8209 New Hampshire Ave., Hyattsville, Md.

Filed Oct. 11, 1950, Ser. No. 189,640

13 Claims. (Cl. 324—43)

(Granted under Title 35, U.S. Code (1952), sec. 266)

This invention relates primarily to the art of detecting the presence and determining the magnetic effects of localized magnetic fields in locations having large changes in the ambient magnetic field such, for example, as those locations in which magnetic storms commonly occur or in factory areas. More particularly, the instant invention is concerned with a new and novel detector of total field gradients and which is capable of detection of such gradients in the presence of sizable changes in the ambient magnetic field.

A plurality of magnetometers of the total field type such, for example, as that disclosed in the application of Everett M. Hafner for Magnetometer, Serial No. 609,307, filed August 6, 1945, now Patent No. 2,924,883, and in which three interconnected detecting elements are arranged in mutually perpendicular relationship, are arranged to function as a total magnetic field gradiometer to detect the presence of magnetic effects in objects placed in close adjacency to one of the magnetometers. One form of the test set herein disclosed and claimed has been designed specifically for detecting the presence of undesired spurious magnetic fields and uncompensated current fields in batteries used in certain types of apparatus such, for example, as in depth charge firing control systems of the character disclosed in the application for patent by Joseph B. Tate, Jr. et al., Serial No. 621,155, filed October 8, 1945, and now abandoned. However, it will be apparent to those skilled in the art to which the present invention pertains, after an understanding thereof, that many other uses thereof are available such, for example, as measuring the magnetic properties of casings for magnetic mines and magnetic airborne detectors, comparing the magnetic characteristics and the calibration of magnets, and measuring the efficiency of shielding disposed about an object which is known to be magnetic. The magnetic characteristics of any object, component, or assembly can be detected, measured, and evaluated by the use of the device herein disclosed. After evaluation of the magnetic characteristics, the body under observation may be found to be acceptable for use, rejected, or compensating means may be added to produce the magnetic characteristics desired.

It has been found that certain types of batteries such, for example, as those batteries used in magnetically sensitive depth charge firing control mechanisms must have substantially non-magnetic characteristics. For example, the maximum distortion in a battery being tested in a background field having a strength of 500 milligauss, or larger, must be less than ±¼ milligauss for any orientation of the battery relative to the background field. This distortion includes all effects of magnetic materials used in the battery as well as effects of uncompensated current loops in the battery wiring and terminal socket.

By reason of the requirement for a battery having substantially non-magnetic characteristics for use in certain types of magnetically actuated apparatus having a substantially non-magnetic characteristic it is desirable and possible, by the apparatus herein disclosed and claimed to detect a 0.05 milligauss change in the strength of an ambient field having a strength of 600 milligauss.

Heretofore, it is believed that there has been no test set capable of testing, within small tolerances in industrial or magnetic storm areas, the magnetic effects of various components of an apparatus in which a battery is to be used as well as the components of the battery itself in such systems as those in which, after assembly, the resulting apparatus including the battery must be magnetically neutral or must have certain other predetermined magnetic characteristics.

The use of a depth charge firing mechanism of the type disclosed in the hereinbefore mentioned patent application by Joseph B. Tate, Jr. et al. for performing magnetic tests upon the batteries to be used therein has been attempted but this method of testing batteries possesses the disadvantage that background field changes in industrial areas, where the tests are normally performed, are not balanced out and, therefore, only a low sensitivity can be obtained. Furthermore, the detector element is not conveniently arranged for routine measurements under various orientation conditions of the test object.

A gradiometer of any conventional type such, for example, as a single-component magnetic detector heretofore has been used to measure changes in the ambient field, but the results obtained by such measurements have been found to be incomplete since such a device is a one-component field detector and is not capable of measuring the true change in the magnitude of the total field.

Although magnetic gradiometers comprising two oppositely wound coils for the purpose of bucking out undesirable magnetic background noise have heretofore been used, it is believed that the use of two total field magnetometers at least one of which is pivotally mounted on a base in such a manner that two mutually perpendicular faces of the pivotally mounted magnetometer are exposed for test and calibrating purposes to provide a total field magnetic detector and test set having electronic and balancing circuits, hereinafter described, is not known in the prior art. The principles of operation which make these features of the instant invention advantageous will be more fully understood as the description proceeds.

The battery magnetic test set, in accordance with a preferred form of my invention, comprises a control unit with an associated power supply, a recording milliammeter, a calibrating unit, a milliampere D.C. meter, two total field magnetometers, and appropriate mounting stands, two types of which are disclosed hereinafter.

Accordingly, one of the objects of the present invention is the provision of a new and improved method and apparatus for determining the magnetic properties of elements to be incorporated in other structure such, for example, as a magnetic mine, in which the foregoing difficulties are obviated and which is adapted to perform all the functions of analogous apparatus heretofore proposed or now in general use.

An additional object of the invention resides in a novel and improved method and apparatus whereby the magnetic properties of batteries may be determined and evaluated in magnetically-noisy locations and at varying room temperatures.

Still another object of the instant invention is the provision of a magnetic test set which is capable of testing magnetic effects present in a test object in various magnetic latitudes.

Another object of this invention is the provision of a total field magnetic detector and test set wherein a pair of total field magnetometers are arranged as a magnetic field gradiometer.

An additional object is to provide a device which will indicate the response of a total field detector to the magnetic effects of components of a test object such, for example, as the depth charge firing mechanism of the hereinbefore identified application to Joseph B. Tate, Jr. et al.

Other objects and many of the attendant advantages of this invention will be readily appreciated as the same becomes better understood by reference to the following detailed description when considered in connection with the accompanying drawings wherein:

Figure 1:
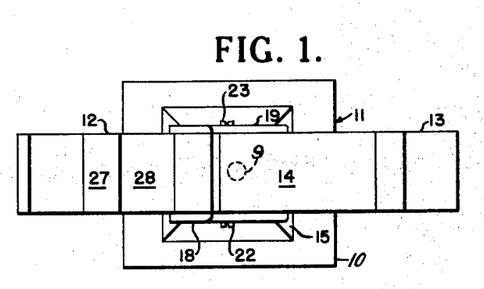
Fig. 1 is a plan view in diagrammatic form of a mounting stand having a pair of total field magnetometers mounted thereon and appropriate connections therefor in accordance with one form of my invention and which is specifically adapted for testing small objects.

Referring now to the accompanying drawings in which like reference numerals are employed to designate like parts, and more particularly to Fig. 1 thereof in which reference numeral 11 generally designates a mounting stand having a pair of magnetometers 12 and 13 mounted thereon in a manner to be more fully described hereinafter. The assembly shown in Figs. 1 and 2 in combination with the remainder of the system, hereinafter described, is specifically designed for detecting and measuring the magnetic effects of small objects such, for example, as those present in a battery of the type used in the depth charge firing control mechanism to which reference has been made hereinbefore, the battery being placed near one of the magnetometers at the beginning of the test. By the use of the apparatus shown in Figs. 1 and 2 the presence of undesired magnetic materials in the battery as well as uncompensated current fields therein, when the battery is under a loaded condition, are detected.

Figure 2:
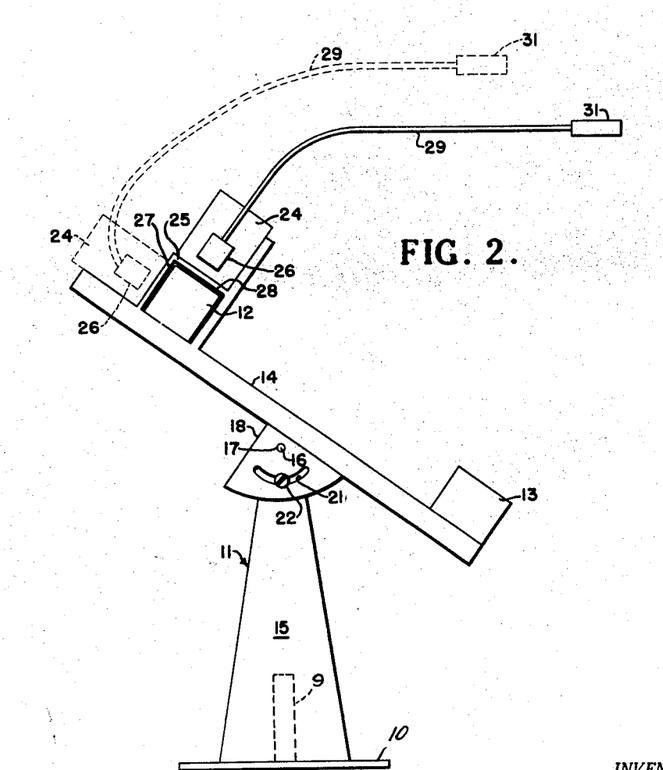
Fig. 2 is an elevation view of the apparatus of Fig. 1.

As is readily apparent from an inspection of Fig. 2, the magnetometers 12 and 13, which are of the total field magnitude type such as that disclosed in the application of Everett M. Hafner, hereinbefore identified, are carried by a tilting beam 14 which is pivotally mounted upon the magnetometer stand 15 by a horizontally disposed trunnion 16 arranged within the stand 15 and projecting laterally therefrom on each of two diametrically opposed sides of the stand to register with and be received by an opening 17 in each of two transversely spaced arcuate brackets 18 and 19 which may be secured to the tilting beam 14 in any suitable manner such, for example, as by welding. The brackets 18 and 19 are each provided with an arcuately shaped slot 21 through which clamping members 22 and 23 cooperate with the brackets 18 and 19, respectively, whereby the beam 14 may be tilted to any desired angle of dip. It will be readily understood by those skilled in the art to which the present invention is directed that the tilting beam 14 additionally may be mounted in such a manner so as to be rotatable about a vertical axis as well as a horizontal axis or, if desired, about a plurality of axes. Such a mounting or connection between the beam 14 and stand 15 may be readily effected by any suitable means such, for example, as a connection of the universal joint type. As presently contemplated, however, the mounting stand 15 is constructed so as to be rotatable about a vertical axis indicated generally by the pivotal member 9 secured to the base plate 10.

The two magnetometers 12 and 13 are arranged upon the tilting beam 14 in such a manner as to form a gradiometer arrangement which cancels out background magnetic field fluctuations and thereby permits operation of the test set at high detecting sensitivity levels in industrial areas in which magnetic field disturbances exist. The magnetometers are placed on the beam 14 at a sufficient distance from one another so that the object under test such, for example, as battery 24 can be moved into close adjacency with one magnetometer without affecting the other magnetometer appreciably.

The tilting beam 14 is provided with a platform 25 around one of the magnetometers for the purpose of supporting the test object in the proper test positions. The two proper test positions for a battery of the type used in the depth charge firing control mechanism, hereinbefore mentioned, are shown in Fig. 2 by use of full lines to designate one position of the battery 24 and broken lines to indicate the other position.

Magnetometers 12 and 13 are each provided with a small test coil, not shown, on the interior thereof to enable calibrating fields to be applied by the calibration unit of Fig. 7 as will be more fully described hereinafter. However, the series connected core coils or inductor elements of the total field magnetometer together yield an inductance depression from the zero field value which is substantially proportional to the square of the strength of an external magnetic field at the location of the magnetometer when the coils are excited by a common sinusoidal current of optimum value. Therefore, a small test signal will not be fully effective in changing the magnitude unless the field is in line with the background field so that the addition is algebraic instead of vectorial. For this purpose, the two magnetometers are mounted on the tilting beam 14 hereinbefore disclosed in such a manner that the longitudinal axis of the tilting beam is parallel to the test coil axis, and, therefore, the stand 15 and tilting beam 14 are adjusted so that the aforementioned axis is aligned with the direction of the background field before any calibration of the test set is attempted.

In addition, this procedure of aligning the test coil axis with the direction of the background field places the test magnetometer 12 and the platform 25 into a position especially suited for testing the magnetic fields of the test object, as averaged over the volume of the magnetometer. Should one surface of the test object be of more interest than the others, this surface should be placed on the platform nearest the magnetometer face. For example, in testing the battery 24, the end of the battery toward which the battery plug 26 is positioned must be placed on the platform 25 immediately adjacent to a magnetometer face. If the magnetometer face selected is perpendicular to the background field direction such, for example, as face 27, then the magnetic effect measured is substantially the component effect perpendicular to that face, as averaged over the magnetometer's volume, since only the field component parallel to the background field direction is effective in the measurement of small magnetic effects, as hereinbefore stated. Similarly, should magnetometer face 28 be selected, the component of the field of the test object which is parallel to that face is measured, as an average effect over the volume of the magnetometer. In this latter position, rotation about an axis perpendicular to the test face 28 will bring into evidence the maximum and minimum values of the parallel component. A 360° rotation is necessary for complete coverage, if magnetic induction effects are present as well as permanent current fields. Theoretically, a similar rotation of the test object on magnetometer face 27 is not necessary, but in practice some variation is observable by reason of the differences in the response of a total field detector to magnetic effects of components of the test object. Use of the test positions in which the magnetometer faces 27 and 28 are employed, accompanied by rotation of the test object thereon, completely surveys the magnetic effects of the test object as detected by the total-field magnetometer, since three mutually perpendicular components of the total magnetic effect of the object are thereby observed.

In testing an object which is to be used in either the north or south magnetic latitudes at a sufficiently great distance from the magnetic equator and where the earth's field is substantially vertical, the field component of the test object which is vertical when assembled in the equipment with which it is to be used is of primary importance. In regions near the magnetic equator that field component which is horizontal in the assembled position of the test object is of major importance. Testing in intermediate regions can be accomplished by tilting the beam 14 in such a manner that the beam will be parallel to the direction of the background magnetic field.

A concentric shielded cable 29 with a switch having resistors incorporated therein is provided and is connected to the battery being tested for the purpose of loading the battery. The concentric cable prevents any current loops in the cable conductors from affecting the measurements being made. However, uncompensated current loops exist in switch 31, and, for this reason, the switch end of cable 29 should be held away from the magnetometers at a substantial distance such, for example, as two feet.

Figure 3:
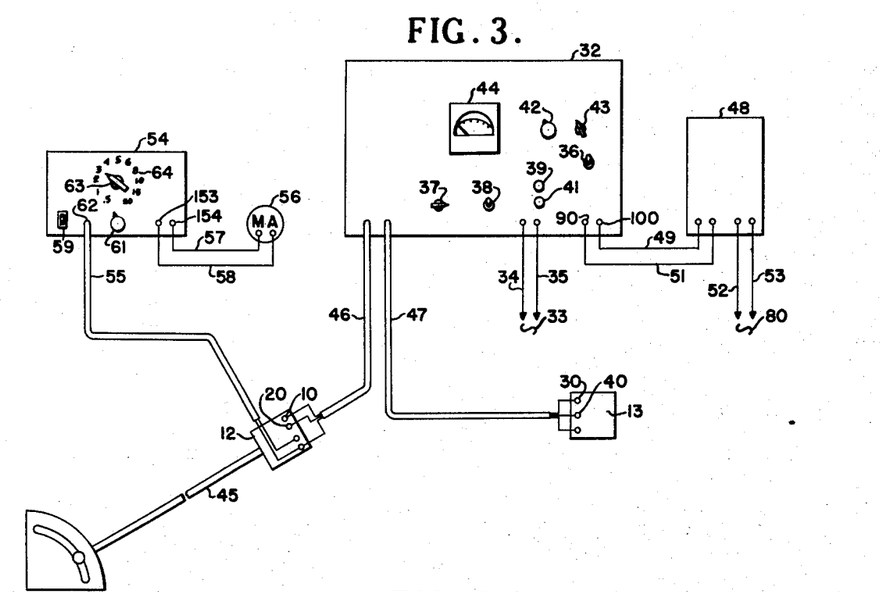
Fig. 3 is a diagrammatic showing of the test set of the present invention and in which is incorporated another form of mounting stand for the total field magnetometers and which stand is useful in testing large objects.

Referring now to Fig. 3 which is a diagrammatic showing of the test set of the present invention connected with a magnetometer stand for testing large objects, the control unit is designated by the numeral 32 and is connected to a source 33 of alternating current by conductors 34 and 35.

Figure 5:
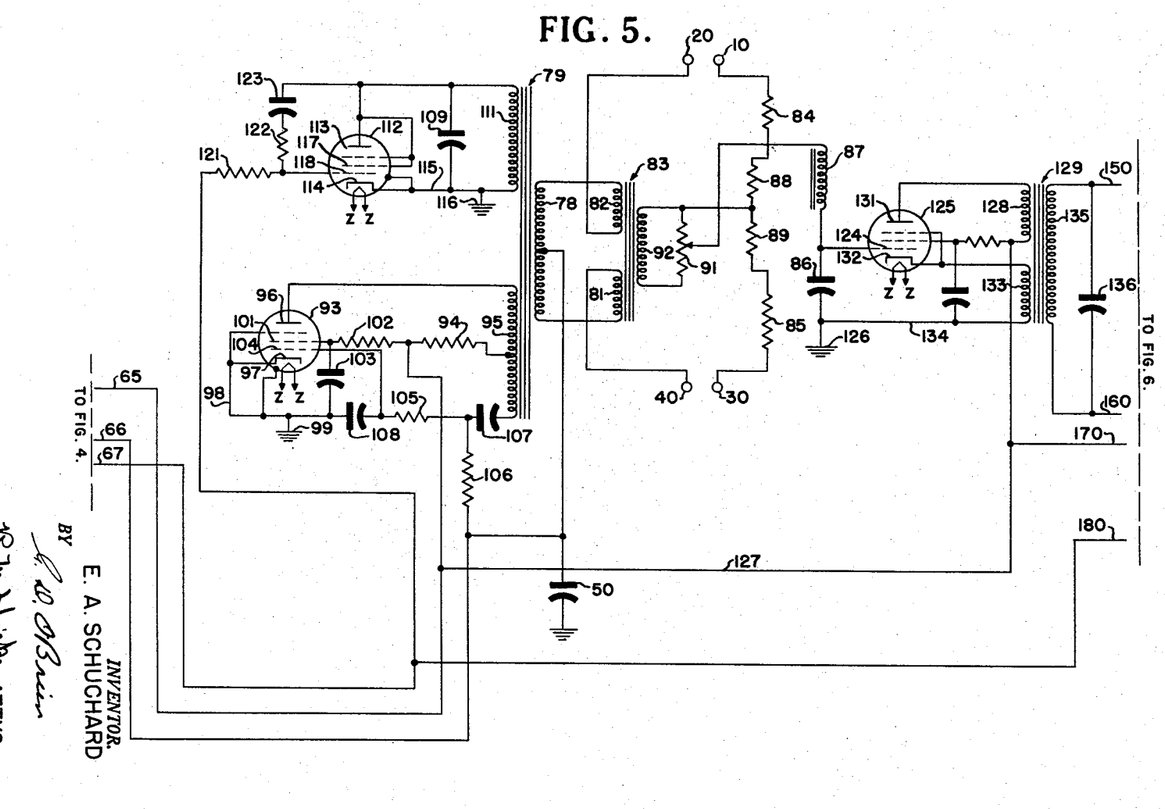
Fig. 5 is a schematic showing of a portion of the circuitry of the control unit of the test set.
Figure 6:
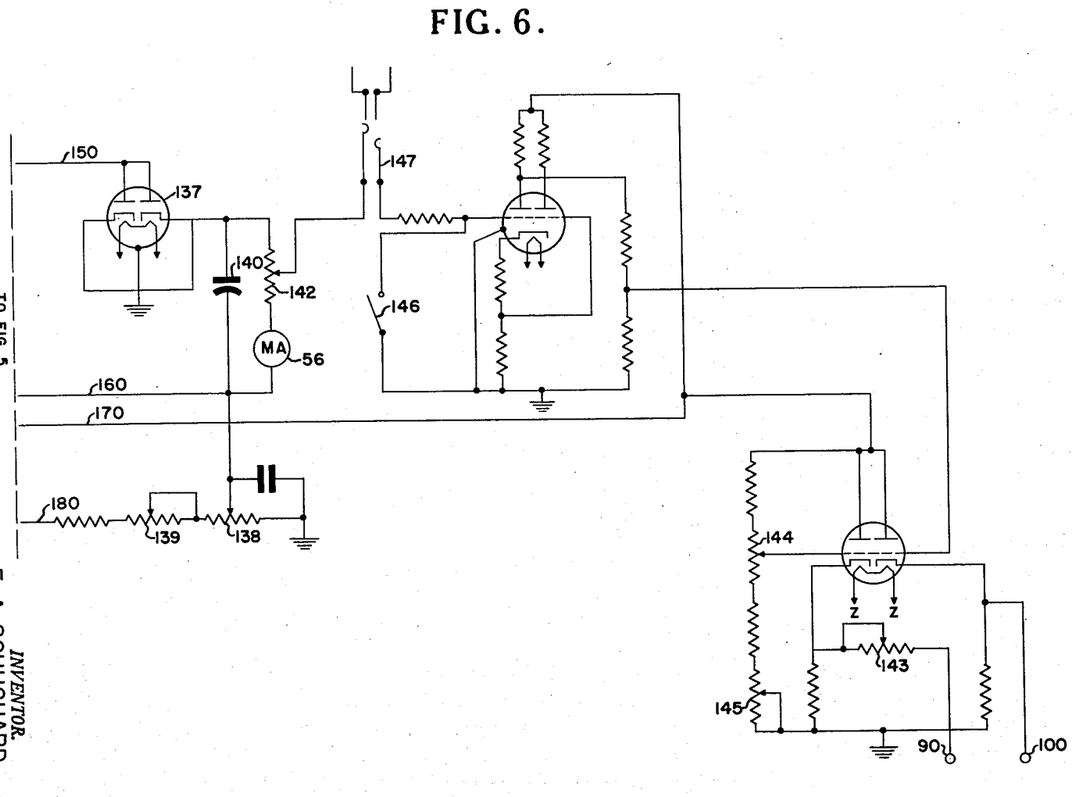
Fig. 6 is the remainder of the control unit circuitry shown in schematic form.

The control unit is provided with suitable controls for adjusting certain of the elements in the control unit circuit shown in Figs. 5 and 6, as will become more apparent as the description proceeds. In the specific control unit illustrated, herein, the control panel thereof is provided with a power switch lever 36 sensitivity control knob 37, a meter return switch lever 38, coarse and fine meter center control knobs 39 and 41, respectively, and coarse and fine balancing voltage control knobs 42 and 43, respectively. The control panel of the control unit is also provided with a milliammeter 44.

A magnetometer 12 is mounted on a tilting beam 45 of a magnetometer stand and is connected to the control unit 32 by a shielded cable 46 having two conductors therein. Another magnetometer 13 is connected to the control unit by a shielded cable 47 having two conductors herein and which is similar to cable 46. Magnetometer 13 may be mounted either upon the tilting beam 45 or placed in any suitable position. The cable 47 serves as the magnetic background field input for the control unit while conductor 46 serves as the input for the control unit 32 of background field plus the magnetic effects present in the test object. The background field effect in cable 47 cancels out the same effect in cable 46, and, consequently, only the magnetic effects of the test object itself are recorded on the recording milliammeter 48, which is connected by conductors 49 and 51 to the control unit 32. As is well known, the recorder 48 is connected by conductors 52 and 53 to a 115 volt 60 cycle source of alternating current shown at 80. The photoelectric recording milliammeter is of the conventional type but has been modified so as to constitute a simple galvanometer element which is critically-damped. The leads from the galvanometer element of the recorder are connected to the control unit by way of leads 49 and 51. Both the recorder 48 and the control unit 32 require 60 cycle, 110–120 A.C. power as hereinbefore mentioned. A constant voltage transformer, shown in Fig. 5, is used to supply power to the control unit to provide substantially stable operation. A calibrating unit 54 is connected to the magnetometer 12 by a two conductor cable 55 for the purpose of supplying a calibrating signal to this magnetometer through the use of a monitoring 0–5 milliampere direct current meter 56 connected to the calibrating unit by leads 57 and 58. The manner in which the various conductors or leads, aforedescribed, are connected to the various elements of the system will become more readily apparent as the description proceeds. The control panel of the calibration unit is provided with a reversing switch handle 59, a meter adjustment control knob 61, a calibrating coil jack type connection 62, and an eleven position selector switch knob 63 with the eleven selective positions being shown on a scale 64.

Figure 4:
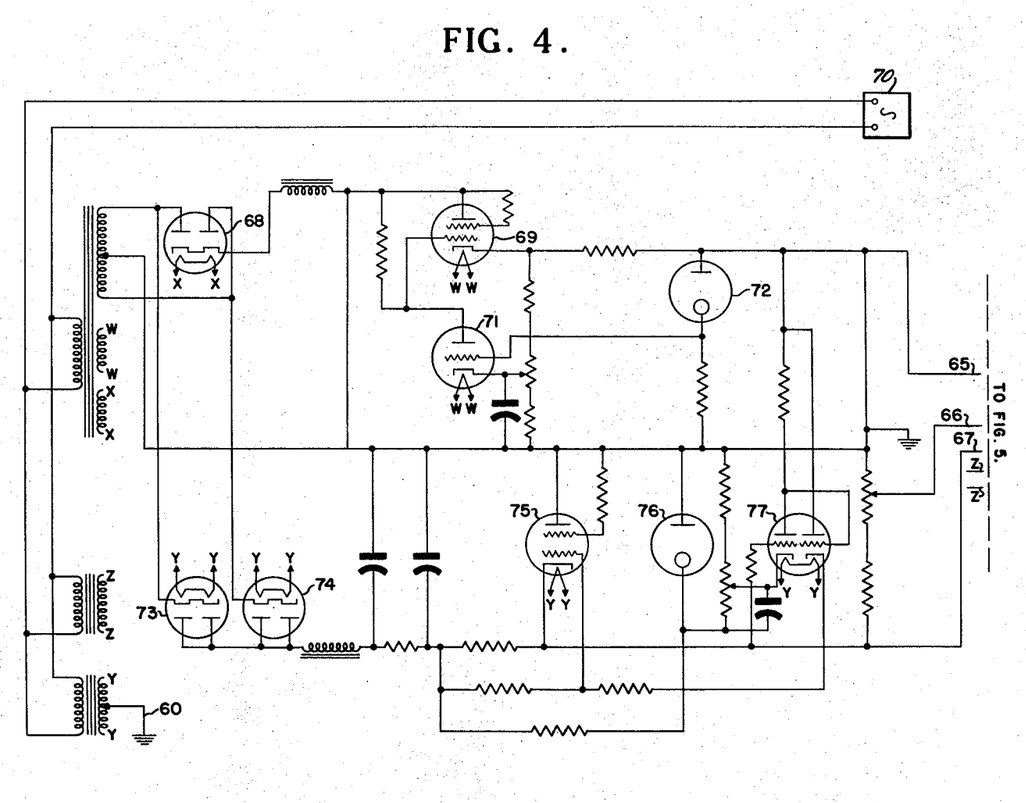
Fig. 4 is a schematic showing of the power supply circuitry.

The control unit of the present invention includes a power supply, a magnetometer bridge and a stabilized direct current amplifier, the power supply portion thereof being schematically shown in Fig. 4 to which reference is now made. It will be readily understood by those skilled in the art that any power supply which will provide suitable power to operate the remainder of the test set may be advantageously utilized and Fig. 4 shows only one specific form of such a power supply. Since power supply circuits per se are well known, it is believed that a general description of this figure will suffice. The particular power supply illustrated in Fig. 4 provides positive source of power 65 of 135 volts and two negative sources of power 66 and 67 of 3 and 100 volts, respectively. A full wave rectifier tube 68 is provided with an associated LC filter circuit and a circuit comprising tubes 69, 71 and 72 which act in concert to maintain the desired positive potential of 135 volts. It will be observed that tube 72 is a voltage regulator tube which couples the output voltage changes to tube 71 and also applies suitable bias to the grid of tube 71. Similarly, the negative potential side of the power supply shown in Fig. 4 comprises two full wave rectifier tubes 73 and 74 with an associated LC circuit and circuitry including a regulator 75 which regulates the negative voltage. The tube 76 applies a cathode bias to one cathode of tube 77 and the function of tubes 75 and 77, acting together, is to maintain the negative potential substantially constant and also to serve as a hum eliminator. The tube heaters WW, XX, and YY, respectively, are connected by suitable conductors to secondary windings correspondingly designated. It will be observed that winding YY is connected to ground at 60. The winding ZZ is connected by suitable conductors to the heaters of the control unit tubes shown in Figs. 5 and 6. A source of 115 volt, 60 cycle alternating current for the power supply unit is denoted by numeral 70. Appropriate circuitry including transformers, resistors and capacitors is operatively connected with the tubes of Fig. 4 so as to produce the desired outputs.

Fig. 5 discloses the circuitry of the control unit with the power supply thereof not shown and some portions of which are substantially similar to the field detecting portion of the circuit shown in Fig. 2 of the copending application of Joseph B. Tate, Jr. et al., hereinbefore identified, it being observed, however, that in the present invention two magnetometers, heretofore mentioned, are used in a gradiometer arrangement, and a power supply of any suitable type such, for example, as the electronic power supply of Fig. 4 is used instead of a power supply provided by a battery.

The magnetometer bridge arrangement will now be described wherein the two magnetometers are connected in a gradiometer arrangement. Magnetometer 12 is arranged as one leg of an inductance bridge circuit by connection to terminals 10 and 20, the bridge circuit also including as the second leg thereof the second magnetometer 13 which is connected to terminals 30 and 40. By reason of the variable character of the impedance of the magnetometers, the inductances thereof also vary in response to changes in the bridge current due to variations in the bridge supply voltage, thus producing an unbalance of the bridge circuit as the value of the bridge current changes. Such an unbalanced condition is compensated by the presence of magnetometer 13 in the bridge circuit. The inductance of magnetometer 13 varies in the same manner as that of the magnetometer 12 in response to bridge current variations, thereby preventing changes in the degree of unbalance of the bridge circuit by reason of changes in the bridge current. Similar compensation occurs for changes in the ambient temperature to which individual magnetometers are sensitive.

The third and fourth legs of the inductance bridge include matched portions of a secondary winding 78 of an iron core transformer generally designated 79. The bridge circuit also includes matched windings 81 and 82 of an iron core transformer generally designated 83, windings 81 and 82 being employed for the purpose of presenting a high impedance to the flow of harmonic frequency currents in the bridge circuit. Any harmonic frequency currents flowing in the bridge circuit intermodulate and produce a distortion of the output of the bridge circuit. Use of windings 81 and 82 in the bridge circuit also makes the total impedance of the circuit large as compared to impedance changes produced therein by variations in the inductance of the magnetometers 12 and 13. Accordingly, such impedance changes produce relatively small changes in the value of the exciting current supplied to the bridge circuit.

The bridge circuit further comprises resistors 84 and 85 for providing a resistance balance therein. The output circuit of the bridge circuit includes a condenser 86, iron core inductance coil 87, resistances 88 and 89 which are adjustable for the employment of different magnetometers, and a voltage source including a potentiometer 91 which is connected in closed circuit with secondary winding 92 of transformer 83. The voltage developed across the portion of the potentiometer between the wiper thereof and resistors 88 and 89 is used to provide the desired degree of inductive balance in the bridge circuit and resistors 88 and 89 are selected to provide the proper resistance balance of the bridge circuit. Condenser 86 and coil 87 together with the bridge inductance are tuned to provide series resonance whereby the impedance to the flow of current through the output circuit is entirely resistive in character, and a voltage appears across condenser 86 which is many times the value of the voltage which appears across the output of the bridge circuit between the center tap of winding 78 and the wiper of potentiometer 91. Thus, considerable gain such, for example, as 50 is realized from the resonant circuit.

The voltage appearing across condenser 86 provides an electrical signal which varies in value in accordance with changes in the magnitude of the external ambient field of the magnetometers, the bridge being balanced at any convenient value of an external magnetic field such that a desired degree of unbalance is obtained in response to the magnitude of the earth's magnetic field in the region of the earth in which the test set is employed.

As disclosed hereinbefore, the core coils or inductor elements of the magnetometers used in the test set of the present invention are so constructed that each element yields an inductance depression which is proportional to the square of the component of an external magnetic field parallel to the magnetic axis thereof when the element is excited by a pure sinusoidal current of optimum value. This type of current is supplied by an oscillator comprising a conventional pentode vacuum tube 93 of the heater type. The plate circuit for tube 93 is supplied from the power supply unit shown in Fig. 4 and is completed therefrom by way of conductor 65, plate resistor 94, the upper portion, as viewed in the drawing, of primary winding 95 of transformer 79, plate 96 and cathode 97 of tube 93, conductor 98 to ground at 99. Screen grid 101 of tube 93 receives its operating potential from conductor 65 through resistor 102 and is coupled to ground 99 by means of the conventional A.C. bypass condenser 103. Control grid 104 of tube 93 normally is maintained at a negative potential with respect to ground due to its connection through resistances 105 and 106 and conductor 66 to the power supply unit of Fig. 4. It will also be observed that A.C. voltage is applied to control grid 104 through a circuit including resistor 94, the lower portion of winding 95, as viewed in Fig. 5, condenser 107, and resistor 105. This A.C. voltage flows to ground through resistor 106 and capacitor 50 and through condenser 108 and ground connection 99 with its return provided by conductor 65. The voltage thus applied to control grid 104 from plate resistor 94 and lower portion of winding 95 is substantially 180° out of phase with the voltage applied to plate 96 from the plate resistor 94 and the upper portion of 95 winding and, therefore, operation of oscillator tube 93 is inherently regenerative in character. Resistor 94 provides negative feedback in proportion to the flow of current therethrough and thus tends to stabilize the operation of the oscillator and reduce distortion. Condenser 108 serves to eliminate parasitic oscillations at a high order of frequencies for the reason that it provides a bypass for voltages at such frequencies.

The oscillator is tuned to a desired frequency such, for example, as 3000 cycles per second by the selection of the value of condenser 109 in relation to the combined inductive effects of windings 78, 95 and 111 of transformer 79 and the inductive effects of the bridge circuit including magnetometer detector 12, condenser 109 preferably being connected across winding 111, as shown. The oscillator builds up at this frequency to the desired amplitude of oscillation due to its inherent regeneration, and is limited at the desired amplitude by means of a regulator tube 112 together with its associated circuit elements. Tube 112 may be a conventional amplifier vacuum tube of any suitable type provided that the grid current is very small and the grid insulation is very high with a grid bias voltage in the order of 100 to 200 volts negative.

The plate circuit for tube 112 may be traced from winding 111 of transformer 79, plate 113 and cathode 114 of tube 112, conductor 115, and thence to ground at 116 on the other side of winding 111, screen grid 117, in this case, being connected to plate 113. Control grid 118 of tube 112 is normally biased at a negative potential such, for example, as 96 volts negative with respect to ground potential at the power supply of Fig. 4 and is connected to the low potential side of the power supply by way of conductor 67 and resistor 121. The control grid also has voltage applied thereto from secondary winding 111 of transformer 79 by way of a grid circuit including condenser 123 and resistor 122, and to grid 118. By reason of the large negative bias on control grid 118, the plate section of tube 112 conducts only during peak portions of positive half cycles of the A.C. voltage applied to the control grid. However, when the voltage across winding 111 reaches such a value that the negative voltage on the control grid is reduced to a predetermined value, sufficient energy is drawn by the tube from the tuned circuit of the oscillator, thereby rendering tube 93 less regenerative in operation and thus causing a reduction in the voltage across windings 78, 95, and 111. Thus, the optimum value of the voltage supplied to the bridge circuit including winding 78 is maintained substantially constant. This voltage is held within very close limits for the reason that small percentage changes in the A.C. voltage at grid 118 of regulator tube 112 produce relatively large percentage changes in the flow of current through the tube. Resistor 122 is initially selected of such value as to provide a desired voltage division in the grid circuit.

The electrical signal appearing across condenser 86 is applied to the control grid 124 of a conventional pentode amplifier vacuum tube 125, the control grid being normally biased at a negative potential with respect to ground potential by reason of its connection to ground 126 by way of inductance 87 and the bridge circuit. The plate circuit of tube 125 is supplied from the power supply 70 of Fig. 4 and may be traced from the high potential side thereof by way of conductor 127, primary winding 128 of transformer generally shown at 129, plate 131, cathode 132, and thence by way of winding 133 of transformer 129 to ground potential at 126 by way of conductor 134. The voltage developed across winding 133 is applied to the cathode with such polarity with respect to the polarity of the voltage applied to the plate from primary winding 128 that degenerative feedback is provided for tube 125, thereby to stabilize the operation thereof, increasing the tube's effective input grid impedance and reducing the tube's effective output impedance in order to avoid drift in the amplifier. Drift would produce voltages in the output of the amplifier, which voltages would appear as apparent signals. Cathodes 97, 114 and 132 of tubes 93, 112 and 125 respectively are of the heater type having heaters ZZ, hereinbefore mentioned.

The amplified output of tube 125 appears across secondary winding 135 of transformer 129, and a condenser 136 is connected thereacross to tune the secondary winding in order to provide optimum gain conditions. The voltage appearing across winding 135 is applied to a control channel adapted to respond to increases and decreases in the voltage, which increases and decreases correspond to signals received in response to variations in the strength of the field. This channel starts with and includes a conventional diode vacuum tube 137 and may be traced through the remainder of the circuitry shown in Fig. 6.

Rectifier 137 is connected to winding 135. Thus, condenser 140 associated with resistor 142 and rectifier 137 are charged substantially to the positive peak value of the A.C. voltage appearing across winding 135 thus constituting a detector circuit.

A stabilized D.C. amplifier is coupled directly to the detector circuit, hereinbefore described. The amplifier drives the photoelectric recording milliammeter 48 of Fig. 3. Potentiometers 138 and 139 which are the coarse and fine adjustments, respectively, for bucking out the voltage appearing on the lower portion of potentiometer 142 so that there will be substantially no voltage appearing between the top of potentiometer 142 and ground, thereby provides adjustments of bucking voltage to be made so that direct coupling between the detector circuit and the amplifier may be effected. These adjustments are possible regardless of the setting of the coarse sensitivity control 142 or of the rectified output of the bridge. The potentiometers 138 and 139 are readjusted to bring the recorder pen back on the scale of the recording milliammeter each time the coarse sensitivity control 142 is changed. Small adjustments of deflection sensitivity can be made by means of a fine sensitivity control 143 without disturbing the voltage balance. Resistors 144 and 145 which are the coarse and fine meter center adjustments, respectively, are provided to permit adjustment of the electrical balance of the amplifier for zero output with the input grid shorted when the meter return switch 146 is closed. Resistors 144 and 145 normally are not adjusted except when switch 146 is closed since the adjustment of these resistances alters the linearity of the amplifier. Terminals 90 and 100 of the control unit are connected to the recorder 48, Fig. 3.

The balance adjustment of the magnetometer bridge is indicated by the microammeter 56. Should the reading of microammeter 56 not be within the range of 10 to 50 microamperes, the operation of tube 125 or 137 may be non-linear whereupon the slide wire potentiometer 91 may be adjusted until the reading is within this range.

A jack 147 is provided for direct connection of an external voltage to the input grid of the D.C. amplifier, should it be desired to measure an external voltage. Maximum sensitivity of the amplifier-recorder portion of the test set is approximately full scale deflection for 0.2 volt input. The optimum linearity is obtained at the maximum sensitivity, with resistance 143 set at zero, and with the meter center controls, 144 and 145, adjusted for zero output with zero input, provided switch 146 is closed.

The frequency response of the test set of the present invention is substantially flat from zero to four cycles per second, provided a high-speed basic element such, for example, as one having a natural period of 0.16 second and having a suitable damping shunt is used in the recorder. The recorder system, however, has a resonance phenomena at approximately 8 cycles per second, especially if deflections of more than ten chart divisions of the scale of the microammeter 56 are involved.

In order that the test set may be used for the measurements of very rapid transients or for rapid periodic magnetic effects suitable calibration and/or allowances are necessary. The magnetic calibration of the test set is obtained by means of the calibration unit shown in schematic form in Fig. 3, the circuit diagram therefor being shown in Fig. 7.

Figure 7:
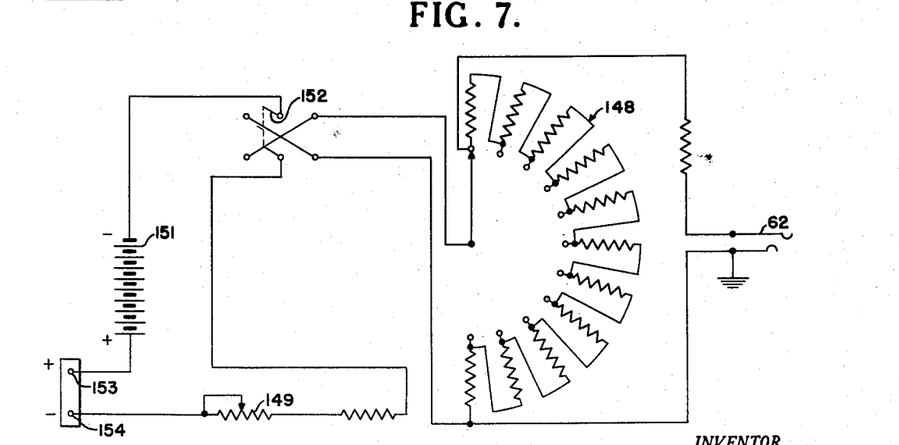
Fig. 7 schematically shows the circuit of a calibrating unit in accordance with a preferred form of my invention.

Referring now to Fig. 7, it will be observed that the circuit shown therein is an adaptation of the Aryton shunt current divider. To produce the magnetic signals marked on the selector switch, shown generally at 148 and the control knob therefor being shown at 63 in Fig. 3, it is only necessary to adjust the meter current to the value marked on the control panel scale 64 by means of the meter adjustment control knob 61 which is operatively connected to the variable resistor 149, and this adjustment need not change except as the internal batteries 151 run down. Since precision wire wound resistors which are adjusted to a tolerance of ±1% are used throughout, the accuracy of the test set is determined for the most part by the meter used and by the initial calibration.

The initial calibration is accomplished by inserting the test magnetometer in a calibrated shielded solenoid and determining the current setting of the meter 56 to best null the standard signals derived from the calibrated shielded solenoid. The calibration unit 54 is provided with terminals 153 and 154 for the accommodation of leads 57 and 58 connecting the meter 56 to the calibration unit.

The test set of the instant invention should be located in a magnetically quiet region, well removed from iron objects, machinery, or fluctuating D.C. power lines, since the magnetometer spacing used permits detection of fluctuating gradients of 0.1 milligauss per foot. The test set itself affords a a convenient means for checking the magnetic background stability. A location, to be satisfactory, should have a background field of at least 500 milligauss magnitude with not more than 0.1 milligauss instability.

Before the magnetometer signal coil and calibration unit 54 can be used for calibration of the recorder deflections, the magnetometer support must be in substantial alignment with the direction of the background field, as hereinbefore stated. After being properly oriented, the magnetometer stand should be secured to a fixed surface. Should the test set be located in a wooden building, published earth-field data, i.e. the magnetic north bearing and the angle of dip, for the locality may be sufficiently accurate to accomplish the alignment, hereinbefore mentioned. However, if the test set is located in a building constructed of materials other than wood, the actual direction of magnetic north should be measured by means of a compass and dip needle.

*Operation*

For an understanding of the operation of applicant's test set, reference is now made alternately to Figs. 3 and 6. After the power switch 36 is turned on, a sufficient length of time is permitted to elapse such, for example, as five minutes to allow the stabilization of the electronic circuits of the test set before making any adjustments thereon. Then, with the balancing voltage coarse control 138 set at the zero position thereof by means of the control knob 42, if the microammeter 44 on the control unit 32 does not read 30±20 microamperes, the slide wire control 91 is adjusted until a reading of 30 microamperes appears on the microammeter 44. Since two settings of the slide wire control are possible for the 30 microampere reading, it should be stated that the setting for which the calibration deflections, positive and negative, are substantially equal is the setting chosen for use. The mechanical centering of the recorder element 48 is then adjusted by means of the levers or knobs 39 and 41 carried by the control panel of the control unit. The electrical balance of the D.C. amplifier is next tested by depressing the meter return lever 38 which is mechanically connected to switch 146 and the necessary readjustment is accomplished by means of the meter center controls 39 and 41. Upon the return of the meter return lever to its initial position, the balancing voltage controls 138 and 139 are adjusted by manipulation of the coarse and fine balancing voltage control knobs 42 and 43, respectively, to bring the recorder pen back on the scale. The test set is now ready for calibration and use.

The calibration procedure for calibrating the test set of the instant invention will now be described. With the magnetometer test coil axis aligned with the direction of the background field, in the manner hereinbefore described, and with the current in the calibration unit set to the proper value, as aforedescribed, the double pole, double throw reversing switch 152, having a control lever 59, is set to its positive or negative setting, thereby to cause a signal value for which the selector switch 148 has been set to be applied. While the recorder chart is running, a series of these calibrating signals such, for example, as 1, 2, 3, 4, and 5 milligauss, respectively, should be applied for a few seconds each, and for both polarities. This provides a calibrated scale on the recorder chart by means of which deflections can be read off directly in milligauss values and fractions thereof estimated on a proportional basis since the D.C. amplifier-recorder system is normally linear to about ±5%. By adjusting the sensitivity control 143, as hereinbefore stated, the recorder chart can be subtantially direct reading, e.g. five or ten divisions per milligauss. If the background field fluctuations at the test location are noticeable, the deflection sensitivity may be lowered to facilitate observation of the measurements.

Except in the initial adjustment, hereinbefore described, the meter center controls 144 and 145 are not used to recenter the recorder pen, but, instead, the recorder pen is recentered by means of the balancing voltage controls 138 and 139.

A calibration run, such as that outlined hereinbefore, should be made before and after each series of measurements, or at least once a day, having first adjusted the sensitivity controls 142 and 143 to give a suitable deflection sensitivity for the particular tests involved.

The apparatus is now in adjustment whereby tests may be made. With the recorder paper running, the object under test is moved to the various magnetometer test faces and is then rotated in a manner similar to that disclosed hereinbefore for the test of a battery of the type used in certain depth charge firing mechanisms. The test motions should be quite rapid although not so rapid that the flat frequency response, hereinbefore mentioned, of the system is exceeded because the recorder pen may have a small amount of drift caused by temperature gradients between the two magnetometers and also by the warm-up time effects in the circuit of the test set. Allowance for test set drift may be made by removing the test object completely at the end of the test and drawing a line on the recording tape between the beginning and end of the test run for the zero reference line. Current loop effects can be tested easily by turning the current on and off through shielded leads with the loop stationary at the various test positions.

As a specific example of the operation of the present invention, the steps of the test procedure followed in testing a battery of the type used in certain depth charge mechanisms will now be described.

As hereinbefore stated, a background field of at least 500 milligauss is employed and the magnetometer support or tilting beam is aligned with the direction of the background field. The battery is placed on the test platform with the end of the battery toward which the battery plug is displaced nearest the test magnetometer since this end is placed nearest the magnetometer used in the depth charge firing mechanism when the battery is positioned within the firing mechanism. The platform-magnetometer face normal to the background field direction is selected as the face adjacent to which the battery is to be positioned initially. It will be observed by reference to Fig. 2 that the battery cable is not disconnected from the battery during the test. The recorder pen is recentered, if necessary, by means of the balancing voltage controls 138 and 139. The loading switch 31, Fig. 2, on the compensated battery cable is closed for a short duration of time such, for example, as two to four seconds, the switch 31 being held at least two feet from the magnetometer stand. The battery is then removed quickly to at least two feet from the magnetometer stand and then is replaced on the platform face 28, as shown in Fig. 2, keeping the same battery end facing the magnetometer. The battery is thus oriented so that the battery face, nearest which the battery plug 26 is positioned, is parallel to the magnetic background field direction. The battery is then placed under load for a short duration of time such, for example, as two to four seconds. The battery is then rotated through 90° about an axis perpendicular to the end thereof and is again loaded for a moment such as two to four seconds, for example. Then the battery is removed quickly from the stand and the test set is calibrated in the foregoing manner.

The test procedure for testing large objects such, for example, as the casings of magnetic mines, magnetic airborne detectors, magnetically sensitive depth charge casings, and components thereof depends upon the shape and size of the object to be tested. A complete test for magnetic effects will be obtained if the object is arranged for movement in a circular path with the plane of the circle containing the resultant background field vector and with the test magnetometer at the center of rotation. The radius of the circle of rotation should correspond to the distance at which the test object is to be separated from the detector in the assembled apparatus such, for example, as the assembled depth charge firing mechanism. The test object is spun about the radius as an axis as it is moved through the circular path, hereinbefore mentioned. By following this procedure, the maximum and minimum combinations of induced and permanent magnetic effects present in the test object will be exhibited for the given background field for all conditions of tilt and spin motions.

It will be apparent to those skilled in the art that the apparatus herein disclosed may be used as a detecting unit for the purpose of triggering a firing circuit in certain types of ordnance equipment such, for example, as mines and depth charges of the magnetic type. For example, instead of merely measuring the presence and magnitude of magnetic effects, a firing circuit may be triggered when the magnetic gradient measured by the pair of magnetometers reaches a predetermined value upon the approach of a body of magnetic material such, for example, as a ship.

Briefly stated in summary, the present invention contemplates the provision of a new and improved method and apparatus for detecting the presence of a magnetic field in a test object and in a locality having a large magnetic background or ambient field. The detector portion of the test set comprises two total field magnetometers which are mounted on the stand of the test set in such a manner that a gradiometer arrangement is effected whereby background magnetic field disturbances may be eliminated. One of the magnetometers is pivotally mounted on the stand whereby the test coil axis thereof may be aligned in parallel relation with the direction of the background field existing at the test location thereby enabling a standard calibrating signal to be applied to the magnetometer and to situate the faces thereof in the optimum position for the battery test.

The present invention is of particular value since during the use thereof much greater ambient background field changes can exist without detrimental effect to the operation of the test set than those which can be tolerated with those devices of the prior art and, simultaneously with such changes, local gradients produced by the object under test may be detected. Consequently, the test set can be used with superior results in industrial and factory localities and at sensitivities not possible of attainment with a single magnetometer detector.

While the invention has been described with reference to certain preferred examples thereof which give satisfactory results, it will be understood by those skilled in the art to which the invention pertains, after understanding the invention, that various changes and modifications may be made without departing from the spirit and scope of the invention, and it is my intention, therefore, to cover in the appended claims all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

1. In apparatus of the character disclosed, a magnetometer stand, a tilting beam mounted on said stand for pivotal movement about a horizontal axis, a plurality of total field magnetometers operatively associated with one another to form a magnetic field gradiometer, at least one of said magnetometers being carried by said beam and having one of the detecting elements thereof adapted to be brought into alignment with the ambient magnetic field, and recording means electrically connected to said gradiometer for recording magnetic fields present in a test object and detected by the gradiometer when the test object is positioned in close adjacency with one of the magnetometers.

2. A total field magnetic detector and test set comprising a mounting means, a pair of total field magnetometers at least one of which is carried by said mounting means, and circuit means interconnecting said magnetometers in a gradiometer arrangement.

3. A system of the character disclosed for measuring the effects of a magnetic field in a test object comprising, a mounting stand, a tilting beam mounted on said stand for pivotal movement in a vertical plane, a plurality of total field magnetometers at least one of which is carried by said beam, a control unit, a source of alternating current for said control unit, a bridge network carried by said control unit and electrically connected to said magnetometers, an amplifier circuit electrically connected to said bridge network, a power supply for said bridge network and electrically connected thereto, a source of alternating current for said power supply, a recording milliammeter electrically connected to said amplifier circuit, and calibrating means electrically connected to a calibrating coil in one of said magnetometers for selectively producing predetermined changes in the background magnetic field present in the vicinity of said one magnetometer for calibrating the system.

4. A system of the character disclosed comprising, in combination, a mounting stand, a tilting beam pivotally mounted upon said stand, a pair of total field magnetometers at least one of which is carried by said beam, a control unit, power source means connected to said control unit, electrical conductors interconnecting said magnetometers and said control unit whereby said magnetometers are employed in a gradiometer arrangement, a recording milliammeter electrically connected to said control unit, and calibration means electrically connected to a calibrating coil of a selected one of the magnetometers for producing predetermined changes in the ambient magnetic field present in the vicinity of said selected magnetometer for calibrating the system.

5. The method of detecting and measuring the magnetic field present in a test object to be placed in a magnetically actuated device including a detector comprising the steps of aligning the calibrating coil of a total field magnetometer with the ambient magnetic field, positioning a test object in a predetermined manner adjacent to said magnetometer, moving said test object in a circular path in a plane containing the resultant background field vector and with the magnetometer at the center of rotation, the circular path having a radius equal to the distance at which the test object is to be separated from the detector in the assembled magnetically actuated device, and spinning the test object about an axis coinciding with said radius simultaneously with the movement of the test object along the circular path.

6. The method of detecting and measuring the magnetic field present in a test object by a test set including a pair of total field magnetometers connected in a gradiometer arrangement, comprising the steps of placing the test object in close adjacency to a face of one magnetometer, said face being normal to the direction of the ambient field, rotating the test object about an axis normal to said face, rapidly removing the test object from said face, moving said test object into close adjacency to another face of said one magnetometer, said other face being parallel to the direction of the ambient field, rotating the test object about an axis normal to the last named face, and rapidly removing the test object from the magnetometer whereby ambient background field changes are ineffective to produce detrimental effects on the test data obtained.

7. Apparatus of the character disclosed comprising, in combination, a pair of total field magnetometers, a mounting stand, a tilting beam carried by said stand, at least one of said magnetometers being carried by the tilting beam, a power supply, a magnetometer bridge circuit having a transformer connection with said power supply, predetermined portions of said bridge circuit being connected respectively to said magnetometers, a detector circuit, amplifying means connecting said detector circuit to said bridge circuit, an amplifier circuit connected on the input side thereof to the output side of said detector circuit, and means connected to the output side of said amplifier circuit for recording the effects of the magnetic field present in a test object disposed in close adjacency to one of said magnetometers.

8. A test set for detecting and measuring the magnetic characteristics of a test object comprising, in combination, a power supply, a control unit connected to said power supply and including a bridge network, a pair of total field magnetometers connected to two legs of said network respectively in a gradiometer arrangement, and means connected to said control unit for recording the magnetic characteristics of said test object.

9. A test set control unit of the character disclosed comprising, in combination, a source of power, a bridge network including inductive and resistive balance means and terminal means adapted for connection respectively to a pair of external total field magnetometers, means connecting said network to the source of power, voltage signal amplifying means connected to the bridge network, a detector circuit including a rectifier connected to the output side of said amplifying means, and a stabilized direct current amplifier circuit connected to said detector circuit and including voltage, sensitivity, and meter center potentiometers in said amplifier circuit for controlling the output thereof and a pair of output terminals for connection to a recording meter.

10. A test set control unit of the character disclosed comprising, in combination, terminal means for connection to a source of power, a bridge network including terminals for connecting a pair of total field magnetometers in gradiometer arrangement, a detector circuit, an amplifier circuit, and terminal means included in said amplifier circuit for connection to a recording device, said network and circuits being operatively interconnected whereby signals received by the control unit from the magnetometers are detected and amplified.

11. A test set mount of the character disclosed comprising a mounting stand, a tilting beam carried by said mounting stand and adapted for pivotal movement about a horizontal axis, means for locking the beam in a selected tilted position, a pair of total field magnetometers respectively mounted upon the end portions of said beams and in predetermined parallel relationship thereto whereby the beam and magnetometers may be tilted and locked in alignment with the direction of the flux lines of the ambient magnetic field.

12. A test set mount of the character disclosed comprising a mounting stand, a tilting beam carried by said mounting stand and adapted for pivotal movement about a horizontal axis, means for locking the beam in a selected tilted position, and a pair of total field magnetometers at least one of which is mounted upon said and in predetermined parallel relationship thereto whereby the beam and magnetometers may be tilted and locked in alignment with the direction of the flux lines of the ambient magnetic field.

13. A test set mount of the character disclosed comprising a support, a beam carried by said support and adapted for pivotal movement about a horizontal axis to a selected setting, means for locking the beam in said setting, and a total field magnetometer mounted upon said beam whereby the magnetometer is tilted to a position in alignment with the direction of the flux lines of the ambient magnetic field when the beam is locked in said selected setting.

References Cited in the file of this patent
UNITED STATES PATENTS

| | | |
|---|---|---|
| 2,074,742 | Drake | Mar. 23, 1937 |
| 2,170,515 | Dionne et al. | Aug. 22, 1939 |
| 2,266,358 | DeLanty | Dec. 16, 1941 |
| 2,358,027 | Penther et al. | Sept. 12, 1944 |
| 2,412,046 | Hoare | Dec. 3, 1946 |
| 2,491,736 | Irwin | Dec. 20, 1949 |
| 2,501,598 | Eltonton et al. | Mar. 21, 1950 |
| 2,552,089 | Dionne | May 8, 1951 |

UNITED STATES PATENT OFFICE
CERTIFICATE OF CORRECTION

Patent No. 2,961,604　　　　　　　　　　　　　November 22, 1960

Earl A. Schuchard

It is hereby certified that error appears in the above numbered patent requiring correction and that the said Letters Patent should read as corrected below.

Column 1, line 28, strike out "now Patent No. 2,924,883,".

Signed and sealed this 27th day of March 1962.

(SEAL)
Attest:

ERNEST W. SWIDER
Attesting Officer

DAVID L. LADD
Commissioner of Patents